United States Patent
Murray et al.

(10) Patent No.: US 9,058,193 B2
(45) Date of Patent: Jun. 16, 2015

(54) METHODS AND SYSTEMS FOR PROVIDING COMPATIBILITY OF APPLICATIONS WITH MULTIPLE VERSIONS OF AN OPERATING SYSTEM

(71) Applicant: Google Inc., Mountain View, CA (US)

(72) Inventors: Timothy Murray, San Francisco, CA (US); Stephen Roderick Hines, San Jose, CA (US); Rudy Jason Sams, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/079,897

(22) Filed: Nov. 14, 2013

(65) Prior Publication Data

US 2015/0135170 A1 May 14, 2015

(51) Int. Cl.
*G06F 9/44* (2006.01)
*G06F 9/455* (2006.01)
*G06F 9/445* (2006.01)

(52) U.S. Cl.
CPC ........ *G06F 9/45516* (2013.01); *G06F 9/44536* (2013.01)

(58) Field of Classification Search
None
See application file for complete search history.

(56) References Cited

U.S. PATENT DOCUMENTS

| | | | | |
|---|---|---|---|---|
| 5,414,854 A * | 5/1995 | Heninger et al. | | 713/1 |
| 5,613,120 A * | 3/1997 | Palay et al. | | 717/165 |
| 5,822,787 A * | 10/1998 | Zucker | | 711/213 |
| 6,128,590 A * | 10/2000 | Stadel et al. | | 703/27 |
| 6,138,271 A * | 10/2000 | Keeley | | 717/140 |
| 6,324,687 B1 * | 11/2001 | Beadle et al. | | 717/148 |
| 6,393,495 B1 * | 5/2002 | Flory et al. | | 719/327 |
| 6,560,774 B1 * | 5/2003 | Gordon et al. | | 717/146 |
| 6,643,657 B1 * | 11/2003 | Baird et al. | | 1/1 |
| 6,745,385 B1 * | 6/2004 | Lupu et al. | | 717/163 |
| 7,805,706 B1 * | 9/2010 | Ly et al. | | 717/121 |
| 8,001,083 B1 * | 8/2011 | Offer | | 707/636 |
| 8,600,726 B1 * | 12/2013 | Varshney et al. | | 703/26 |
| 2002/0133805 A1 * | 9/2002 | Pugh et al. | | 717/120 |
| 2002/0143468 A1 * | 10/2002 | Cheng et al. | | 702/1 |
| 2003/0167463 A1 * | 9/2003 | Munsil et al. | | 717/170 |

(Continued)

OTHER PUBLICATIONS

NVIDIA, Parallel Thread Execution ISA, Application Guide, v3.2, Jul. 2013, http://docs.nvidia.com/cuda/pdf/ptx_isa_3.2.pdf.

(Continued)

*Primary Examiner* — Jason Mitchell
(74) *Attorney, Agent, or Firm* — McDonnell Boehnen Hulbert & Berghoff LLP

(57) ABSTRACT

Methods and systems for providing compatibility of applications with multiple versions of an operating system are provided. The method may comprise receiving, by a device, a request to perform a function-call of an application that references features of a first version of an operating system. The method also includes determining whether a version of the operating system and a system library on the device supports the function-call of the application so as to be able to perform dynamic compilation of code in the system library for the function-call at run-time, and based on the determination, accessing a compatibility library associated with the application that includes pre-compiled code for execution by a given device having a given version of the operating system other than the first version of the operating system. The method also includes at run-time, performing the function-call using corresponding pre-compiled code from the compatibility library.

20 Claims, 5 Drawing Sheets

(56) References Cited

U.S. PATENT DOCUMENTS

| | | | |
|---|---|---|---|
| 2003/0187929 A1* | 10/2003 | Pugh et al. | 709/205 |
| 2004/0054946 A1* | 3/2004 | Atallah et al. | 714/38 |
| 2004/0143752 A1* | 7/2004 | Kumar | 713/200 |
| 2004/0162930 A1* | 8/2004 | Forin et al. | 711/1 |
| 2004/0210672 A1* | 10/2004 | Pulleyn et al. | 709/245 |
| 2005/0066325 A1* | 3/2005 | Mori et al. | 717/174 |
| 2006/0070053 A1* | 3/2006 | Andersen et al. | 717/163 |
| 2007/0011199 A1* | 1/2007 | Hunt et al. | 707/104.1 |
| 2007/0168957 A1* | 7/2007 | Li et al. | 717/120 |
| 2008/0010630 A1* | 1/2008 | Ou-Yang et al. | 717/121 |
| 2009/0300600 A1* | 12/2009 | Sugai | 717/174 |
| 2010/0058302 A1* | 3/2010 | Broscaru et al. | 717/151 |
| 2012/0214416 A1* | 8/2012 | Kent et al. | 455/41.2 |
| 2012/0290560 A1* | 11/2012 | Das | 707/722 |

OTHER PUBLICATIONS

SPIR 1.0 Specification for Open CL, Khornos Group—OpenCL Working Group—SPIR Subgroup, Aug. 24, 2012, http://www.khronos.org/registry/cl/specs/spir_spec-1.0-provisional.pdf.

* cited by examiner

METHODS AND SYSTEMS FOR PROVIDING COMPATIBILITY OF APPLICATIONS WITH MULTIPLE VERSIONS OF AN OPERATING SYSTEM

BACKGROUND

Unless otherwise indicated herein, the materials described in this section are not prior art to the claims in this application and are not admitted to be prior art by inclusion in this section.

Mobile devices such as smartphones have become more advanced. Some smartphones incorporate a processor that runs computer code, including code that implements an operating system (OS). Computer code run by a smartphone may include both native code (e.g., code written by a creator of the smartphone and/or the operating system) and code developed by third parties (e.g., third party applications). To aid third parties in developing applications, the creator of the smartphone and/or the operating system may offer application developers a software development kit (SDK) and/or an application programming interface (API) that can be integrated into or accessed by applications that the developers create. An SDK may include a library of native code components, samples and documentation.

SUMMARY

In one example, a method performed by a device having an operating system and a system library is provided. The method comprises receiving, by a processor of the device, a request to perform a function-call of an application, and the function-call references one or more features of a first version of the operating system. The method also comprises determining whether a version of the operating system and the system library on the device supports the function-call of the application so as to be able to perform dynamic compilation of code in the system library for the function-call at run-time of the application on the device. The method also comprises based on the determination, accessing a compatibility library associated with the application, and the compatibility library includes pre-compiled code for execution by a given device having a given version of the operating system other than the first version of the operating system. The method also comprises at run-time of the application on the device, performing the function-call of the application using corresponding pre-compiled code from the compatibility library.

In another example, a computer readable memory configured to store instructions that, when executed by a computing device having an operating system and a system library, cause the computing device to perform functions is provided. The functions comprise receiving a request to perform a function-call of an application, and the function-call references one or more features of a first version of the operating system. The functions also comprise determining whether a version of the operating system and the system library on the computing device supports the function-call of the application so as to be able to perform dynamic compilation of code in the system library for the function-call at run-time of the application on the computing device. The functions further comprise based on the determination, accessing a compatibility library associated with the application, and the compatibility library includes pre-compiled code for execution by a given device having a given version of the operating system other than the first version of the operating system. The functions also comprise at run-time of the application on the computing device, performing the function-call of the application using corresponding pre-compiled code from the compatibility library.

In still another example, a system comprising one or more processors configured to execute functions of an operating system and a system library, and data storage configured to store instructions that, when executed by the one or more processors, cause the system to perform functions is provided. The functions comprise receiving a request to perform a function-call of an application, and the function-call references one or more features of a first version of the operating system. The functions also comprise determining whether a version of the operating system and the system library executable by the one or more processors supports the function-call of the application so as to be able to perform dynamic compilation of code in the system library for the function-call at run-time of the application on the system. The functions also comprise based on the determination, accessing a compatibility library associated with the application, and the compatibility library includes pre-compiled code for execution by a given system having a given version of the operating system other than the first version of the operating system. The functions also comprise at run-time of the application on the system, performing the function-call of the application using corresponding pre-compiled code from the compatibility library.

In yet another example, a system is provided that includes a means for receiving a request to perform a function-call of an application, and the function-call references one or more features of a first version of an operating system. The system also includes a means for determining whether a version of the operating system and a system library supports the function-call of the application so as to be able to perform dynamic compilation of code in the system library for the function-call at run-time of the application. The system also includes a means for based on the determination, accessing a compatibility library associated with the application, and the compatibility library includes pre-compiled code for execution by a given device having a given version of the operating system other than the first version of the operating system. The system also includes a means for at run-time of the application, performing the function-call of the application using corresponding pre-compiled code from the compatibility library.

These as well as other aspects, advantages, and alternatives, will become apparent to those of ordinary skill in the art by reading the following detailed description, with reference where appropriate to the accompanying figures.

DETAILED DESCRIPTION

Figure 1:
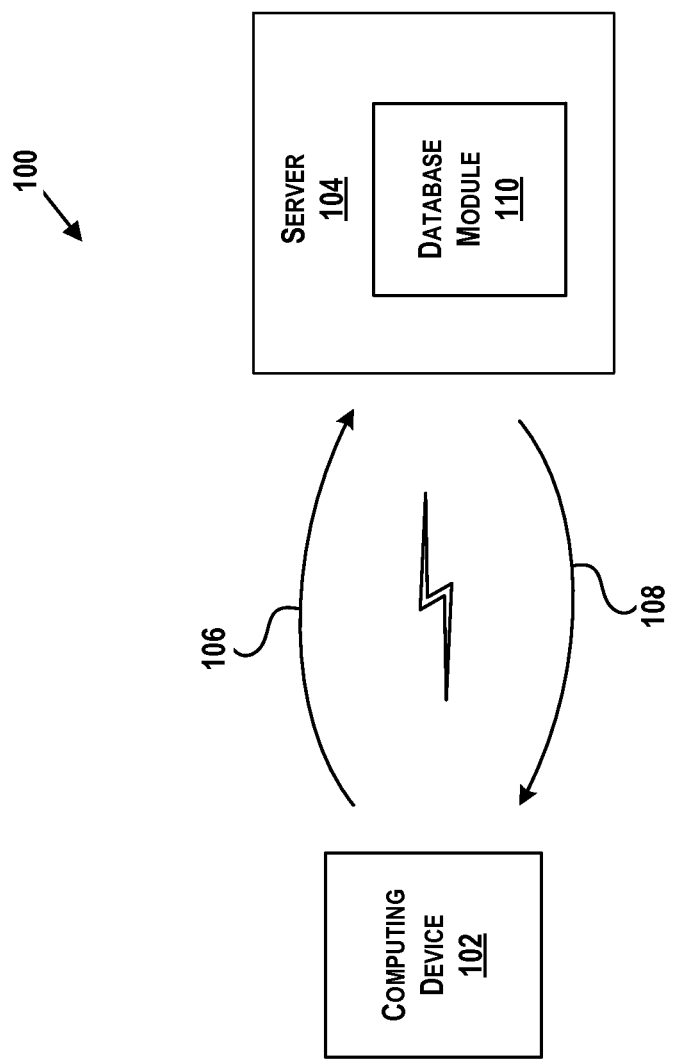
FIG. 1 illustrates an example communication system by which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Computing devices are often configured to operate using an operating system (OS), and the operating system is often updated over time with newer versions that offer additional and/or alternate functionality. Computing devices also may include a number of applications, each of which may be developed based on functionality offered by a specific version of an operating system. For example, newer versions of operating systems may have new versions of system frameworks that are not available in older versions of the operating system. If an application is written based on the newer version of the operating system, the application may not be able to be executed on devices that have the older version. The same applies for applications that are written based on older versions of the operating system that may not be able to be executed on the newer version (if the newer version does not have backwards compatibility). Thus, if a system framework does not support all functionality required by a particular piece of code of an application, the code may not be able to be generated at run-time, and the application may not function properly.

In some examples, computing devices may have a system library that is bundled with an operating system of the device (and may be updated with every new release of the operating system), and developers can specify the system library for execution of features of the application. To avoid the need for developers to develop multiple versions of an application for each of multiple versions of existing operating systems, (e.g., a version that takes advantage of new functionality available in new frameworks and a version that is compatible with a wide range of operating systems), a compatibility library can also be provided for pre-compiled code when needed. Thus, if an application specifies newer features than what is installed on the device, the compatibility library can be accessed to emulate a feature set that is included in a latest version of the operating system. As a result, a determination can be made as to whether an operating system is of a sufficient version to run the application using the system library, or whether to emulate functions of the system library through use of the compatibility library to enable full performance of all applications on latest versions and older versions of an operating system.

Thus, within examples herein, a method is provided that includes receiving a request to perform a function-call of an application that references one or more features of a first version of the operating system, and determining whether a version of the operating system and the system library on the device supports the function-call of the application so as to be able to perform dynamic compilation of code in the system library for the function-call at run-time of the application on the device. Based on the determination, the method includes accessing a compatibility library associated with the application that includes pre-compiled code for execution by a given device having a given version of the operating system other than the first version of the operating system, and at run-time of the application on the device, performing the function-call of the application using corresponding pre-compiled code from the compatibility library. In some examples, when the operating system is not compatible with the application, the compatibility library can be accessed to obtain pre-compiled code for execution. Alternatively, when the operating system is compatible with the application, the application may be executed using dynamic compilation.

Referring now to the figures, FIG. 1 illustrates an example communication system 100 by which an example method may be implemented. The system 100 includes a computing device 102 that may communicate with a server 104 via one or more wired and/or wireless interfaces. The computing device 102 and the server 104 may communicate within a network. Alternatively, the computing device 102 and the server 104 may each reside within a respective network.

The computing device 102 may be any type of computing device or transmitter including a laptop computer, a mobile telephone, or tablet computing device, etc., that is configured to transmit data 106 to, or receive data 108 from, the server 104 in accordance with the method and functions described herein. The computing device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Server 104 may include the same components as computing device 102. Further, the server 104 may be configured to send data 108 to or receive data 106 from the computing device 102. The server 104 may have a database module 110 configured to store a number of applications, music, electronic books, etc., for purchase and/or download by various computing devices. The database module 110 may thus include a digital distribution platform for applications, online electronic data, or other digital media.

The data 106 received by the server 104 from the computing device 102 may take various forms. For example, the computing device 102 may request applications to be downloaded from the server 104. The data 108 sent to the computing device 102 from the server 104 may also take various forms. For example, the server 104 may send to the computing device 102 any requested applications, system libraries, updates to operating systems, etc.

Figure 2:
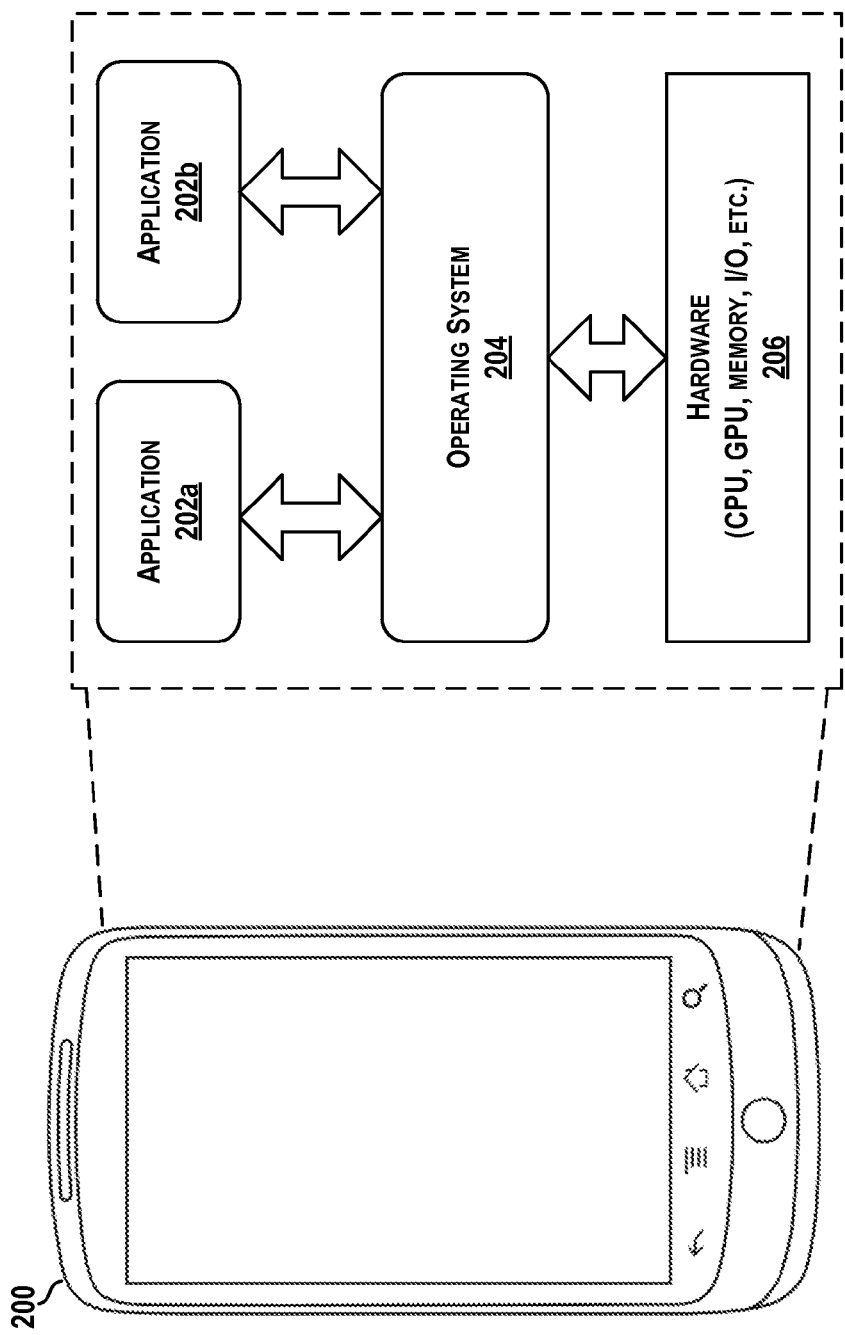
FIG. 2 illustrates an example computing device by which an example method may be implemented.

FIG. 2 illustrates an example computing device 200 by which an example method may be implemented. Computing device 200 may include applications 202a and 202b and an operating system 204 being executed by hardware 206. Although the example computing device 200 is a smartphone, aspects of this disclosure are applicable to other computing devices such as PCs, laptops, tablet computers, etc.

Each of the applications 202a and 202b may include instructions that when executed cause the computing device 200 to perform specific tasks or functions. Applications 202a and 202b may be native applications (i.e., installed by a manufacturer of the computing device 200 and/or a manufacturer of the operating system 204) or may be a third-party application installed by a user of the computing device 200 after purchasing the computing device. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The operating system 204 may interact with and manage hardware 206 to provide services for the applications 202a and 202b. For example, an application 202a may request that the operating system 204 direct an integrated camera of hardware 206 to capture a visual image and that the hardware 206 store the image to memory.

The hardware 206 may include, for example, a central processing unit (CPU), a graphics processor (GPU), memory, an input/output (I/O) interface, user input device(s), output device(s), or other sensors. Components of hardware 206 may be controlled by instructions contained in applications 202a and 202b and operating system 204.

The central processing unit (CPU) may be operable to effectuate the operation of the computing device 200 by executing instructions stored in memory or disk storage. Such instructions may include the operating system 204 and the applications 202a and 202b. The CPU may, for example, comprise a single or multi-core processor, an application specific integrated circuit (ASIC), field programmable gate array (FPGA), and/or any other suitable circuitry.

The graphics processor (i.e., GPU) may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory (which may be non-transitory media). Program memory may store instructions executable by the CPU to effectuate operation of the operating system 204 and the applications 202a and 202b. Runtime memory may store data generated or used during execution of the operating system 204 or applications 202a and 202b.

The input/output (I/O) interface may be operable to receive signals from the input device(s), and provide corresponding signals to the CPU and/or the graphics processor, for example.

The input device(s) may include, for example, a mouse, a touchpad, a motion sensor, a trackball, a voice recognition device, a keyboard, or any other suitable input device which enables a user to interact with the computing device 200.

The output devices may include, for example, a screen and speakers. The screen may be, for example, a liquid crystal display (LCD) screen, an organic light emitting diode (OLED) screen, an e-ink screen, and/or any other suitable device for presenting a graphical user interface.

Figure 3:
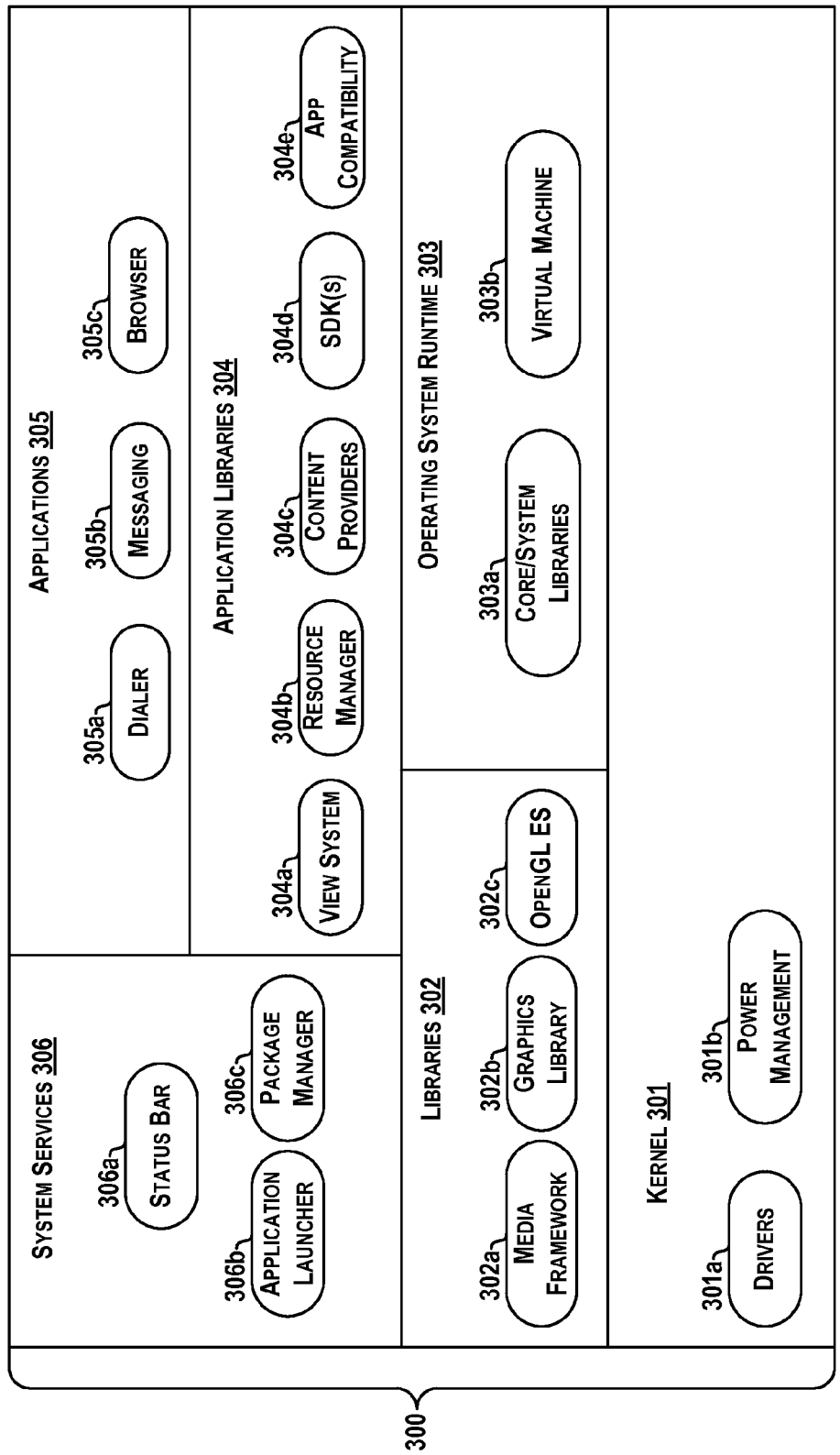
FIG. 3 is a block diagram illustrating example components of an operating system used by a computing device.

FIG. 3 is a block diagram illustrating example components of an operating system 300 used by a computing device. The operating system 300 may invoke multiple processes, while ensuring that an associated phone application is responsive, and that wayward applications do not cause a fault of the operating system 300. Using task switching, the operating system 300 may allow for the switching of applications while on a telephone call, without losing the state of each associated application. The operating system 300 may use an application framework to enable reuse of components, and provide a scalable experience by combining pointing device and keyboard inputs and by allowing for pivoting. The operating system 300 may generally be organized into components including a kernel 301, libraries 302, an operating system runtime 303, application libraries 304, applications 305, and system services 306.

The kernel 301 may include drivers 301a that enable software such as the operating system 300 and applications 306 to interact with input/output devices. The kernel 301 may also include power management processes 301b that coordinate hardware power usage and provide alerts when an integrated battery is running low on power, for example.

The libraries 302 may include several subcomponents, such as media framework 302a, graphics library 302b, and OpenGL ES 302c. The media framework 302a may include functionality that supports standard video, audio and still-frame formats. The graphics library 302b may support two-dimensional application drawing. The OpenGL ES 302c may support gaming and three-dimensional graphics rendering.

The operating system runtime 303 may include core/system libraries 303a and virtual machines 303b. The virtual machines 303b may be custom virtual machines that run a customized file format. The virtual machines 303b may be used with an embedded environment since the virtual machines 303b use runtime memory efficiently, implement a CPU optimized bytecode interpreter, and support multiple virtual machine processes per device.

The application libraries 304 may include libraries for view system 304a, resource manager 304b, and content providers 304c. These application libraries may provide support for applications 305. The application libraries 304 may also include software developer kit(s) (SDKs) 304d and app compatibility 304e, both of which may be associated with or used by applications 305 to perform functions of the applications 305.

The SDKs 304d may further adapt the applications 305 to be able to communicate with one or more pieces of code or functions in the operating system 300. As an example, an application may incorporate an SDK that may adapt the application to be able to communicate with one or more content servers. A content server may provide advertisements and the content SDK may include information about where to get the advertisements, for example, an address of the content server.

The applications 305 may include any number of applications, and examples include a dialer 305a, messaging 305b, and a browser 305c. The dialer 305a may provide functionality related to placing or receiving phone calls. The messaging 305b may provide functionality related to receiving and sending messages, such as email, voice mail, or text messages. The browser 305c may provide functionality related to sending or receiving information via the world wide web. Many other types of applications exist as well and may be downloaded and installed on a computing device.

The system services 306 may include status bar 306a, application launcher 306b, and package manager 306c. The status bar 306a may provide functionality related to providing system notifications. The application launcher 306b may provide functionality related to organization and execution of applications 305. The package manager 306c may maintain information for installed applications 305.

Figure 4:
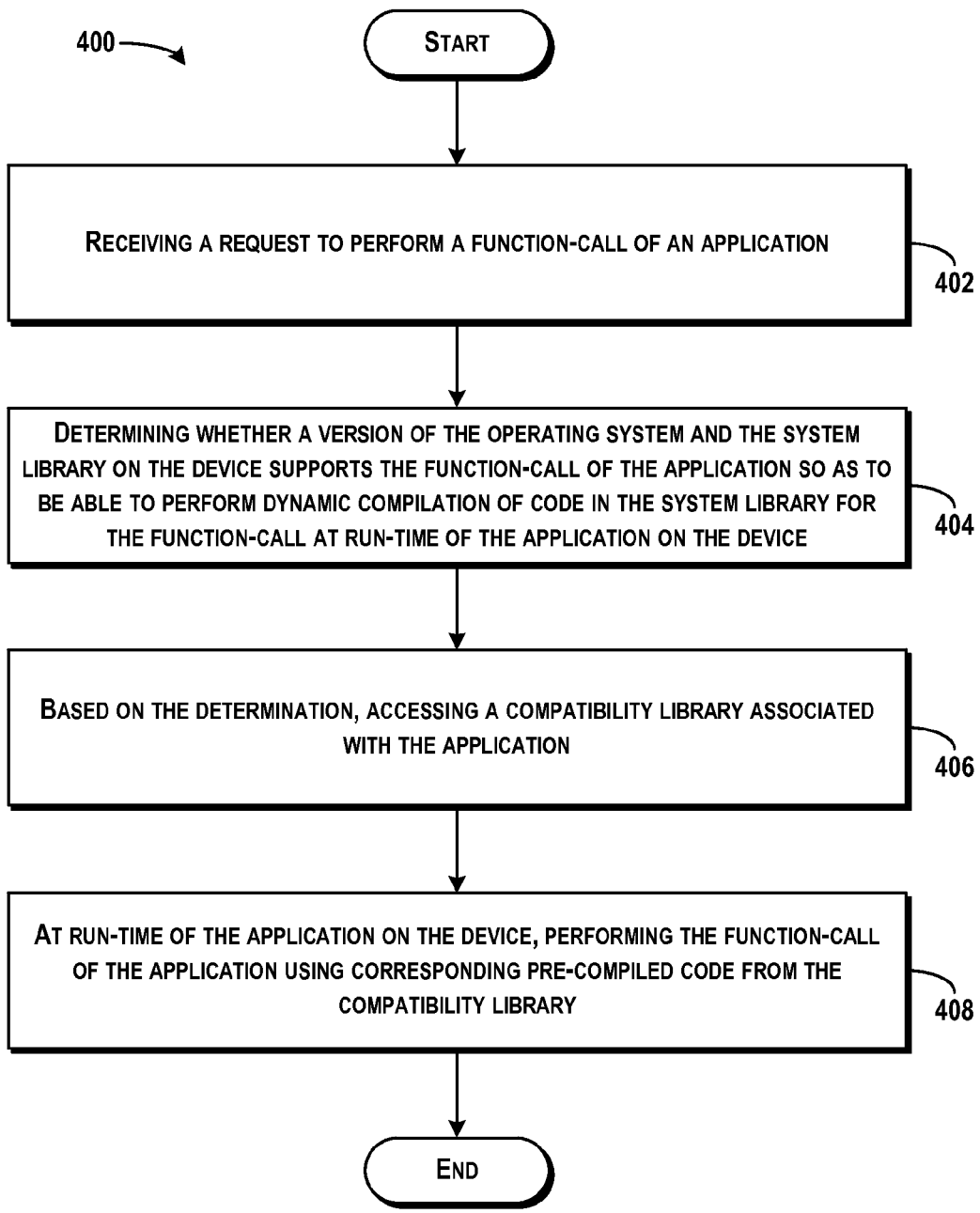
FIG. 4 is a block diagram of an example method for providing compatibility of applications with multiple versions of an operating system, in accordance with at least some embodiments described herein.

FIG. 4 is a block diagram of an example method 400 for providing compatibility of applications with multiple versions of an operating system, in accordance with at least some embodiments described herein. Method 400 shown in FIG. 4 presents an embodiment of a method that, for example, could be used with a computing device, such as illustrated in FIGS.

1-2. Method 400 may include one or more operations, functions, or actions as illustrated by one or more blocks of 402-408. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The program code (or data for the code) may also be stored or provided on other media including communication media, such as a wireless communication media, for example.

In addition, for the method 400 and other processes and methods disclosed herein, each block in FIG. 4 may represent circuitry that is wired to perform the specific logical functions in the process. Functions of the method 400 may be fully performed by a computing device, or may be distributed across multiple computing devices and/or a server (e.g., as shown in FIG. 1). The computing device may have an operating system, such as the operating system 300 in FIG. 3, and the computing device may also have a system library accessible by the operating system. Other example configurations of the computing device are also possible for performing the method 400 in FIG. 4.

At block 402, the method 400 includes receiving a request to perform a function-call of an application. The request may be received by a processor of the device, and the function-call may reference one or more features of a first version of the operating system on the device. As an example, the function-call may reference a certain API of a given version of the operating system. Generally, an operating system may be updated over time, and newer versions of the operating system may be released that provide additional or alternative functionality than prior versions, for example.

At block 404, the method 400 includes determining whether a version of the operating system and the system library on the device supports the function-call of the application so as to be able to perform dynamic compilation of code in the system library for the function-call at run-time of the application on the device. Depending on a version of the operating system, the function-call may not be able to be executed. In examples of the version of the operating system on the device being able to support the function-call of the application, at run-time of the application on the device, the function-call can be performed using dynamic compilation of code in the system library for the function-call. Dynamic compilation of code in the system library can be performed at run-time, and can be based on specific hardware components of the device.

In some examples, the method 400 includes determining whether the version of the operating system on the device is the first version of the operating system. One way to do so is through the API in the SDK to query for a level of the operating system that corresponds to a given version of the operating system. An API level may be expressed by a single integer, which indicates a compatibility of a version of the operating system with an application. The API level may identify or be associated with a framework API revision offered by a version of the operating system, and the framework may include a set of packages or classes, a set of XML elements and attributes for declaring a manifest file, a set of XML elements and attributes for declaring and accessing resources, a set of intents, and a set of permissions that applications can request, for example. The level may indicate a minimum API required for the application to run, and the operating system may prevent installation of an application if the device's API level is lower than a specified value. The application may also have an associated integer designating an API level that the application specifies.

Updates may often be provided for the framework API so that new API remains compatible with earlier versions of the API, and so many changes to the API are additive and introduce new or replacement functionality. As parts of the API are upgraded, older replaced parts may be deprecated but not removed so that existing applications can still use the framework. A particular version of an operating system may support one API level, although support may be implicit for all earlier API levels.

Within examples, the API Level integer or identifier allows application developers to describe a framework API revision that is required to execute the application, and allows the device to negotiate installation of applications such that version-incompatible applications may not be installed. Applications can use a manifest element provided by the framework API to describe minimum and maximum API Levels under which the applications are able to run, as well as a preferred API Level that the application is designed to support. For example, to specify a minimum system API Level that an application requires to run, the application would include in its manifest a value of an integer corresponding to the API Level of an earliest version of the operating system under which the application can run. When the device attempts to install an application, or when revalidating an application after a system update, the operating system may first check the attributes in the application's manifest and compare the values to an internal API level of the operating system. The device may allow installation to begin if the application API level is less than or equal to the device's API level integer. As an example, a specific package may be introduced with API level 3, and if an application uses that API, the application may declare so with an attribute with a value of "3". The application can then be installable on devices having operating systems that support API level 3 or higher.

At block 406, the method 400 includes based on the determination, accessing a compatibility library associated with the application. The compatibility library includes pre-compiled code for execution by a given device having a given version of the operating system other than the first version of the operating system. For example, based on the version of the operating system and the system library on the device being unable to support the function-call of the application, corresponding pre-compiled code from the compatibility library is used. In this example, since the operating system cannot support the function-call, code that has been pre-compiled for execution by the device can be accessed and used to execute the function-call, or at least portions of the function-call. The pre-compiled code in the compatibility library may be executable to emulate the features of the first version of the operating system as referenced by the function-call.

The device may include the application and the compatibility library stored on the device. In some examples, an application package may be downloaded to the device including the application and the compatibility library bundled with the application.

In some examples, the compatibility library includes the pre-compiled code that when executed provides less functionality than functionality of code based on dynamic compilation of code in the system library. The pre-compiled code may be intended for execution by a device that has a given version of the operating system released prior to the first version of the operating system, or released subsequent to the first version of the operating system. For example, newer versions of operating systems may have new versions of system frameworks that are not available in older versions of the operating system, and if the application is written based on the newer version of the operating system, the application may not be able to be executed on devices that have the older version. The same applies for applications that are written based on older versions of the operating system that may not be able to be executed on the newer version (if the newer version does not have backwards compatibility). Thus, if a system framework does not support all functionality required by a particular piece of code, the code may not be able to be generated at run-time, and the application may not function properly. To avoid the need for developers to developer multiple versions of an application for each of multiple versions of existing operating systems, (e.g., a version that takes advantage of new functionality available in new frameworks and a version that is compatible with a wide range of operating systems), the compatibility library can be accessed for pre-compiled code when needed.

In some examples, the compatibility library includes pre-compiled code that is based on requirements within an application binary interface (ABI) for a native developer kit (NDK) of the operating system, and the requirements indicate hardware of the given device for using the given version of the operating system. The NDK may indicate requirements for functionality that devices have to run the operating system that guarantee a fundamental subset of hardware be present on the device. The pre-compiled code may be configured to be executed on a baseline version of the operating system, so as to provide compiled functionality for a lowest common denominator, for example, so that devices running older operating systems that may not have some features can still execute the applications.

In some examples, the method 400 includes switching to a compatibility mode for execution of the application, and then accessing the compatibility library based on the version of the operating system and the system library on the device being unable to support the function-call of the application. The compatibility mode may be indicative of use of the compatibility library in contrast to use of the system library, for example.

At block 408, the method 400 includes at run-time of the application on the device, performing the function-call of the application using corresponding pre-compiled code from the compatibility library. In some examples, the compatibility library may include a version of pre-compiled code for a number of versions of the operating system, and thus, pre-compiled code that corresponds to the version of the operating system on the device may be selected (e.g., using the designated API level) and executed on the device.

Figure 5:
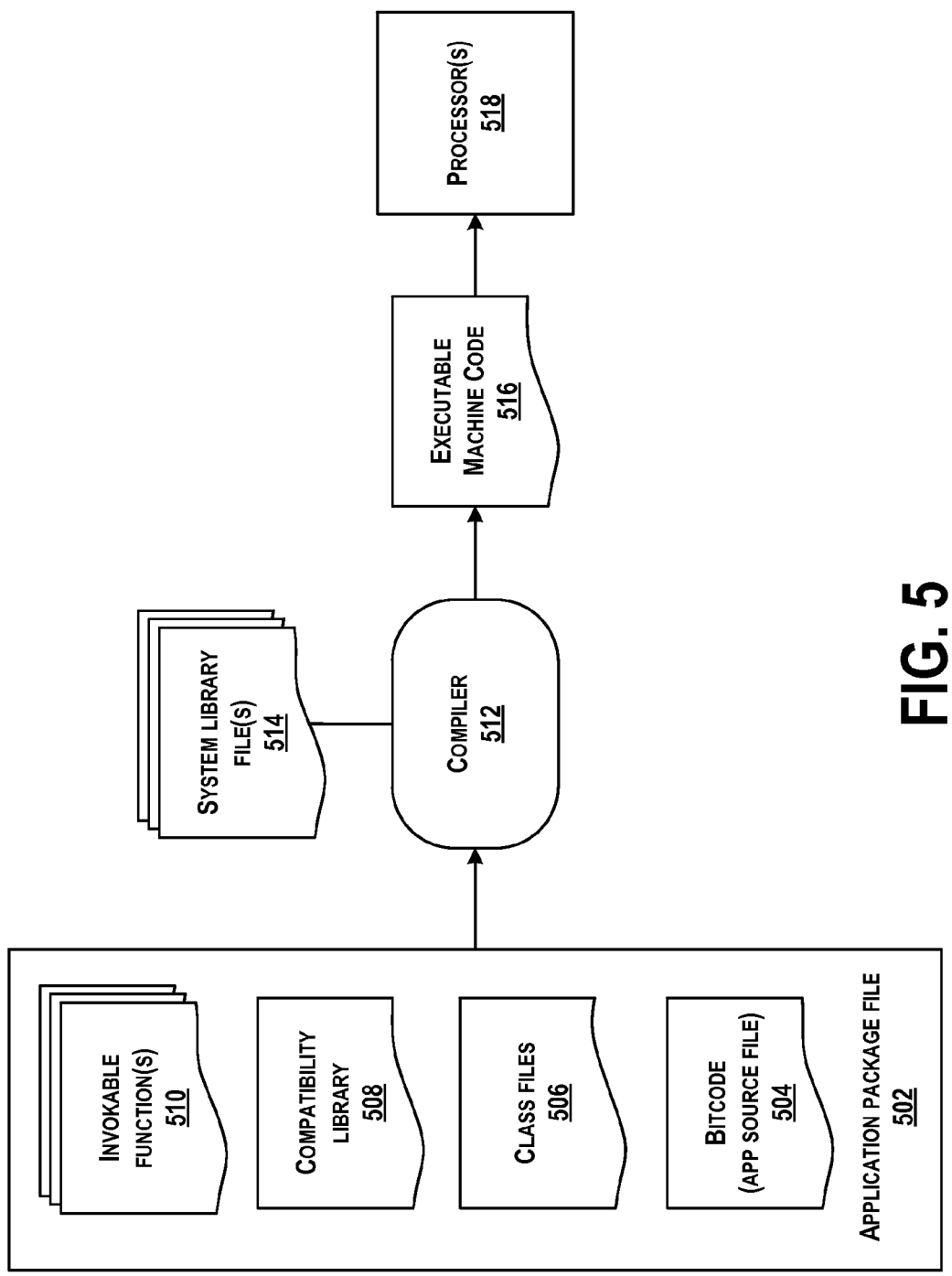
FIG. 5 illustrates an example run-time compiler flow diagram.

FIG. 5 illustrates an example run-time compiler flow diagram. The run-time compiler may be at run-time or execution time during which an application is running or executing. An application package file 502 may be downloaded and installed on a computing device, and the application package file 502 may include bitcode 504 (e.g., converted app source files using a host compiler tool), class files 506, a compatibility library 508, and invokable function(s) 510. At build time, a version of class files and the bitcode for each specified version of an operating system may be determined, and such files may be stored and included in the compatibility library 508.

At run-time, a compiler 512 may execute the bitcode 504 to compile the code for execution. The compiler 512 may determine an API level designated by the application package file 502, and if the API level is less than or equal to an API level of an operating system of the device, the compiler 512 may access system library file(s) 514 to enable execution of the application. In contrast, if the API level designated by the application is more than the API level of the operating system on the device, the compiler 512 may access the compatibility library 508 of the application package file 502 to enable execution of the application. The compiler 512 may then output executable machine code 516 (e.g., CPU instructions or GPU instructions) to one or more processors 518 for execution of the invokable functions 510 of the application.

Thus, at runtime, after a check to verify API levels for the operating system on the device (i.e., does the operating system support API level greater than or equal to the API level designated by the application), use the classes to proxy commands to actual operating system when the API levels are supported. Otherwise, the device is run in compatibility mode for the application, which in turn, uses compatibility APIs stored in the compatibility library 508.

Within examples, applications may generally be forward-compatible with new versions of a given operating system. Because many changes to a framework API are additive, an application developed using any given version of the API (as specified by the API Level) is forward-compatible with later versions of the operating system and higher API levels. The application may be able to be run on all later versions of the operating system, except in some examples where the application uses a part of the API that may have been later removed.

In contrast, applications are not generally backward compatible with versions of the operating system older than the version against which the application was compiled. Each new version of the operating system can include new framework APIs, such as those that give applications access to new platform capabilities or replace existing API parts. The new APIs are accessible to applications when running on the new operating system, and also when running on later versions of the platform, as specified by API Level. Conversely, because earlier versions of the operating system do not include the new APIs, applications that use the new APIs may be unable to run on those operating systems. There may be many devices in the field that run earlier versions of the operating system, and within many examples, such devices may be configured to execute any application using a system library or compatibility library as described herein.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a device having an operating system and a system library, the method comprising:
    receiving, by a processor of the device, a request to perform a function-call of an application, wherein the function-call references one or more features of a first version of the operating system;
    at run-time of the application on the device, based on an identification of a version of the operating system and the system library on the device, determining whether the operating system and the system library support dynamic compilation of code in the system library for the function-call of the application;
    based on the version of the operating system and the system library on the device being unable to support the function-call, accessing a compatibility library associated with the application, wherein the compatibility library includes pre-compiled code compiled for execution by a reference device having a given version of the operating system other than the first version of the operating system;
    determining, based on an application binary interface (ABI) for a native developer kit (NDK) of the given version of the operating system, hardware requirements for using the given version of the operating system;
    identifying a level of compatibility between hardware requirements within an ABI for a NDK of the version of the operating system on the device and the determined hardware requirements; and
    based on the identification of the level of compatibility, at run-time of the application on the device, executing given pre-compiled code from the compatibility library to emulate at least a portion of functionality of the code in the system library referenced by the function-call of the application.

2. The method of claim 1, wherein the compatibility library includes the pre-compiled code that when executed provides less functionality than functionality of code based on the dynamic compilation of the code in the system library.

3. The method of claim 1, wherein the compatibility library includes the pre-compiled code that is based on requirements within the ABI for the NDK of the given version of the operating system.

4. The method of claim 1, wherein the compatibility library includes the pre-compiled code for execution by the reference device having the given version of the operating system released prior to the first version of the operating system.

5. The method of claim 1, wherein the compatibility library includes the pre-compiled code for execution by the reference device having the given version of the operating system released subsequent to the first version of the operating system.

6. The method of claim 1, wherein the pre-compiled code in the compatibility library is executable by the processor to emulate the one or more features of the first version of the operating system.

7. The method of claim 1, wherein the application and the compatibility library are stored on the device.

8. The method of claim 1, wherein the compatibility library comprises a version of pre-compiled code for a number of versions of the operating system other than the first version of the operating system, and the method further comprises:
    selecting from the compatibility library the given pre-compiled code that corresponds to the version of the operating system on the device.

9. The method of claim 1, further comprising determining whether the version of the operating system on the device is the first version of the operating system.

10. The method of claim 1, further comprising based on the version of the operating system and the system library on the device being unable to support the function-call of the application:
    switching to a compatibility mode for execution of the application.

11. The method of claim 1, wherein executing the given precompiled code is based on the version of the operating system and the system library on the device being unable to support the function-call of the application, and the method further comprises:
    based on the version of the operating system and the system library on the device being able to support the function-call of the application, at run-time of the application on the device, performing the function-call of the application based on dynamic compilation of the code in the system library for the function-call.

12. The method of claim 1, further comprising downloading an application package including the application and the compatibility library bundled with the application.

13. A computer readable memory configured to store instructions that, when executed by a computing device having an operating system and a system library, cause the computing device to perform functions comprising:
    receiving a request to perform a function-call of an application, wherein the function-call references one or more features of a first version of the operating system;
    at run-time of the application on the computing device, based on an identification of a version of the operating system and the system library on the computing device, determining whether the operating system and the system library support dynamic compilation of code in the system library for the function-call of the application;
    based on the version of the operating system and the system library on the computing device being unable to support the function-call, accessing a compatibility library associated with the application, wherein the compatibility library includes pre-compiled code compiled for execution by a reference device having a given version of the operating system other than the first version of the operating system;
    determining, based on an application binary interface (ABI) for a native developer kit (NDK) of the given version of the operating system, hardware requirements for using the given version of the operating system;
    identifying a level of compatibility between hardware requirements within an ABI for a NDK of the version of the operating system on the computing device and the determined hardware requirements; and based on the identification of the level of compatibility, at run-time of the application on the computing device, executing given pre-compiled code from the compatibility library to emulate at least a portion of functionality of the code in the system library referenced by the function-call of the application.

14. The computer readable memory of claim 13, wherein the compatibility library includes the pre-compiled code that when executed provides less functionality than functionality of code based on dynamic compilation of the code in the system library.

15. The computer readable memory of claim 13, wherein the compatibility library includes the pre-compiled code for execution by the reference device having the given version of the operating system released prior to the first version of the operating system.

16. The computer readable memory of claim 13, wherein the compatibility library includes the pre-compiled code for execution by the reference device having the given version of the operating system released subsequent to the first version of the operating system.

17. A system comprising:
one or more processors configured to execute functions of an operating system and a system library; and data storage configured to store instructions that, when executed by the one or more processors, cause the system to perform functions comprising:
receiving a request to perform a function-call of an application, wherein the function-call references one or more features of a first version of the operating system;
at run-time of the application on the system, based on an identification of a version of the operating system and the system library on the system, determining whether the operating system and the system library support dynamic compilation of code in the system library for the function-call of the application;
based on the version of the operating system and the system library on the device being unable to support the function-call, accessing a compatibility library associated with the application, wherein the compatibility library includes pre-compiled code compiled for execution by a reference system having a given version of the operating system other than the first version of the operating system;
determining, based on an application binary interface (ABI) for a native developer kit (NDK) of the given version of the operating system, hardware requirements for using the given version of the operating system;
identifying a level of compatibility between hardware requirements within an ABI for a NDK of the version of the operating system on the system and the determined hardware requirements; and
based on the identification of the level of compatibility, at run-time of the application on the system, executing given pre-compiled code from the compatibility library to emulate at least a portion of functionality of the code in the system library referenced by the function-call of the application.

18. The system of claim 17, wherein the pre-compiled code in the compatibility library is executable by the one or more processors to emulate the one or more features of the first version of the operating system.

19. The system of claim 17, wherein the compatibility library comprises a version of pre-compiled code for a number of versions of the operating system other than the first version of the operating system, and the functions further comprise:
selecting from the compatibility library the given pre-compiled code that corresponds to the version of the operating system on the system.

20. The system of claim 17, wherein executing the given precompiled code is based on the version of the operating system and the system library on the system being unable to support the function-call of the application, and the functions further comprise:
based on the version of the operating system and the system library on the system being able to support the function-call of the application, at run-time of the application on the system, performing the function-call of the application based on dynamic compilation of the code in the system library for the function-call.

* * * * *